(12) United States Patent
Ejiri et al.

(10) Patent No.: US 7,506,224 B2
(45) Date of Patent: Mar. 17, 2009

(54) FAILURE RECOVERING METHOD AND RECORDING APPARATUS

(75) Inventors: Arata Ejiri, Kawasaki (JP); Mitsuhiko Ohta, Kawasaki (JP); Seiji Toda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 11/488,233

(22) Filed: Jul. 18, 2006

(65) Prior Publication Data

US 2007/0136624 A1    Jun. 14, 2007

(30) Foreign Application Priority Data

Dec. 13, 2005  (JP)  ............................. 2005-359474
Feb. 16, 2006  (JP)  ............................. 2006-039873

(51) Int. Cl.
  *G11C 29/00*  (2006.01)
(52) U.S. Cl. .......................................... 714/710; 714/2
(58) Field of Classification Search ..................... 713/1; 710/18; 711/114, 163, 202; 714/7, 710, 714/2
See application file for complete search history.

(56) References Cited

U.S. PATENT DOCUMENTS

| | | | | |
|---|---|---|---|---|
| 5,974,544 | A | * | 10/1999 | Jeffries et al. .................. 713/1 |
| 6,223,252 | B1 | * | 4/2001 | Bandera et al. ............. 711/114 |
| 6,427,215 | B2 | * | 7/2002 | Rafanello et al. ........... 714/710 |
| 7,055,058 | B2 | * | 5/2006 | Lee et al. ........................ 714/7 |
| 7,080,167 | B2 | * | 7/2006 | Yagisawa et al. .............. 710/18 |
| 7,197,593 | B2 | * | 3/2007 | Fukuhisa et al. ............... 711/4 |
| 7,383,361 | B2 | * | 6/2008 | Yagisawa et al. .............. 710/15 |
| 2006/0090052 | A1 | * | 4/2006 | Leung ........................ 711/163 |
| 2007/0061545 | A1 | * | 3/2007 | Kuhne ........................ 711/202 |

FOREIGN PATENT DOCUMENTS

JP        2003-233511        8/2003

* cited by examiner

*Primary Examiner*—David Ton
(74) *Attorney, Agent, or Firm*—Greer, Burns & Crain, Ltd.

(57) ABSTRACT

A bad sector is detected by activating a bad sector detecting function of a recording apparatus at a predetermined interval. The bad sector is recovered, when the bad sector is detected at the detecting, by overwriting data on the bad sector with a duplication of the data, and when overwriting fails, by writing the duplication of the data on other sector.

12 Claims, 11 Drawing Sheets

| SELF-TEST RESULT LIST ||| 
|---|---|---|
| DATE AND TIME | PRESENCE OF FAULTY SECTOR | ADDRESS |
| 20051111100000 | NO | |
| 20051111100100 | YES | AAAAAAAA |
| – | – | BBBBBBBB |
| ⋮ | ⋮ | ⋮ |

32

| SECTOR INFORMATION ||
|---|---|
| SECTOR | STORING LOCATION OF DUPLICATED DATA |
| 01-01 | DISK B : CCCCCCCC |
| 01-02 | DISK C : DDDDDDDD |
| 01-03 | ⋮ |
| ⋮ | ⋮ |
| 02-01 | ⋮ |
| ⋮ | ⋮ |

| CAUSE | POINT OF OCCURRENCE | FREQUENCY OF OCCURRENCE | CORRECTIVE ACTION |
|---|---|---|---|
| SWINGING WRITE | RANDOM | CONSTANT FREQUENCY | OVERWRITE |
| MEDIUM DAMAGE | CONCENTRATION (VERTICAL DAMAGE, HORIZONTAL DAMAGE, HOWE) | TEMPORARILY INCREASE | REPLACE |
| HEAD DAMAGE | RANDOM | SUDDEN INCREASE FROM A CERTAIN POINT | STOP USING DISK |

| QUASI-BAD-SECTOR LIST | | |
|---|---|---|
| DATE AND TIME | PRESENCE OF QUASI-BAD-SECTOR | ADDRESS |
| 20052222200000 | NO | |
| 20052222200100 | YES | CCCCCCCC |
| ⋮ | ⋮ | ⋮ |

FIG.12

FAILURE RECOVERING METHOD AND RECORDING APPARATUS

BACKGROUND OF THE INVENTION

1. Field of the Invention

The present invention relates to a technology for recovering a failure in a recording apparatus having a bad-sector detecting function by executing a reading test in each sector.

2. Description of the Related Art

A magnetic disk apparatus having a diagnostic/monitoring function called SMART (Self Monitoring Analysis And Reporting Technology) has been known (see, for example, Japanese Patent Application Laid-Open No. 2003-233511). The SMART function obtains an error frequency indicating the number of errors occurred in a predetermined time on a stead basis, decides that a failure has occurred if the obtained value exceeds a threshold, and makes a report.

Use of the SMART function makes it possible to predict a fatal failure (unrecoverable failure) that will possibly occur to the magnetic disk apparatus, and thus to implement preventive measures such as backing up the magnetic disk apparatus.

The SMART function is also capable of executing so-called "self-test" of reading all the sectors and recording detected bad sectors in a pending list (bad sector list) during the off-time with less disk access.

However, it is difficult to decide the fault of the magnetic disk apparatus based on various information obtained by the SMART function and the result of the self-test. Namely, there are sectors that are temporarily unreadable due to vibration of the apparatus or mechanical wobbling among the sectors recorded in the bad sector list by the self test. On the other hand, there are also sectors that are permanently unusable due to a damage to a recording medium (disk) among the sectors recorded in the bad sector list.

Therefore, it is difficult to distinguish temporary failures from permanent failures on the side receiving a report of bad sectors from the SMART function (for example, an operating system). Therefore, there has been a problem that a recovery could not be appropriately implemented to the fault. For instance, phenomena have been often seen that despite the operating system was once being decided to be temporarily faulty, a permanent failure occurred with subsequent data access, and that despite replacement of the magnetic disk apparatus after decision of a permanent failure, the failure turned out to be temporary.

From this point of view, it is a major problem how to achieve a failure recovering method capable of an appropriate failure recovery using the result of implementation of the SMART function. This problem arises not only to a single magnetic disk apparatus but also to a disk array apparatus including a number of magnetic disk apparatuses.

SUMMARY OF THE INVENTION

It is an object of the present invention to at least solve the problems in the conventional technology.

A failure recovering method according to one aspect of the present invention is for a recording apparatus having a bad sector detecting function for detecting a bad sector by executing a read test on each sector. The failure recovering method includes detecting the bad sector by activating the bad sector detecting function at a predetermined interval; and recovering, when the bad sector is detected at the detecting, the bad sector by overwriting data on the bad sector with a duplication of the data, and when overwriting fails, by writing the duplication of the data on other sector.

A recording apparatus according to another aspect of the present invention has a bad sector detecting function for detecting a bad sector by executing a read test on each sector. The recording apparatus includes a detecting unit that detects the bad sector by activating the bad sector detecting function at a predetermined interval; and a recovering unit that recovers, when the bad sector is detected by the detecting unit, the bad sector by overwriting data on the bad sector with a duplication of the data, and when overwriting fails, by writing the duplication of the data on other sector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
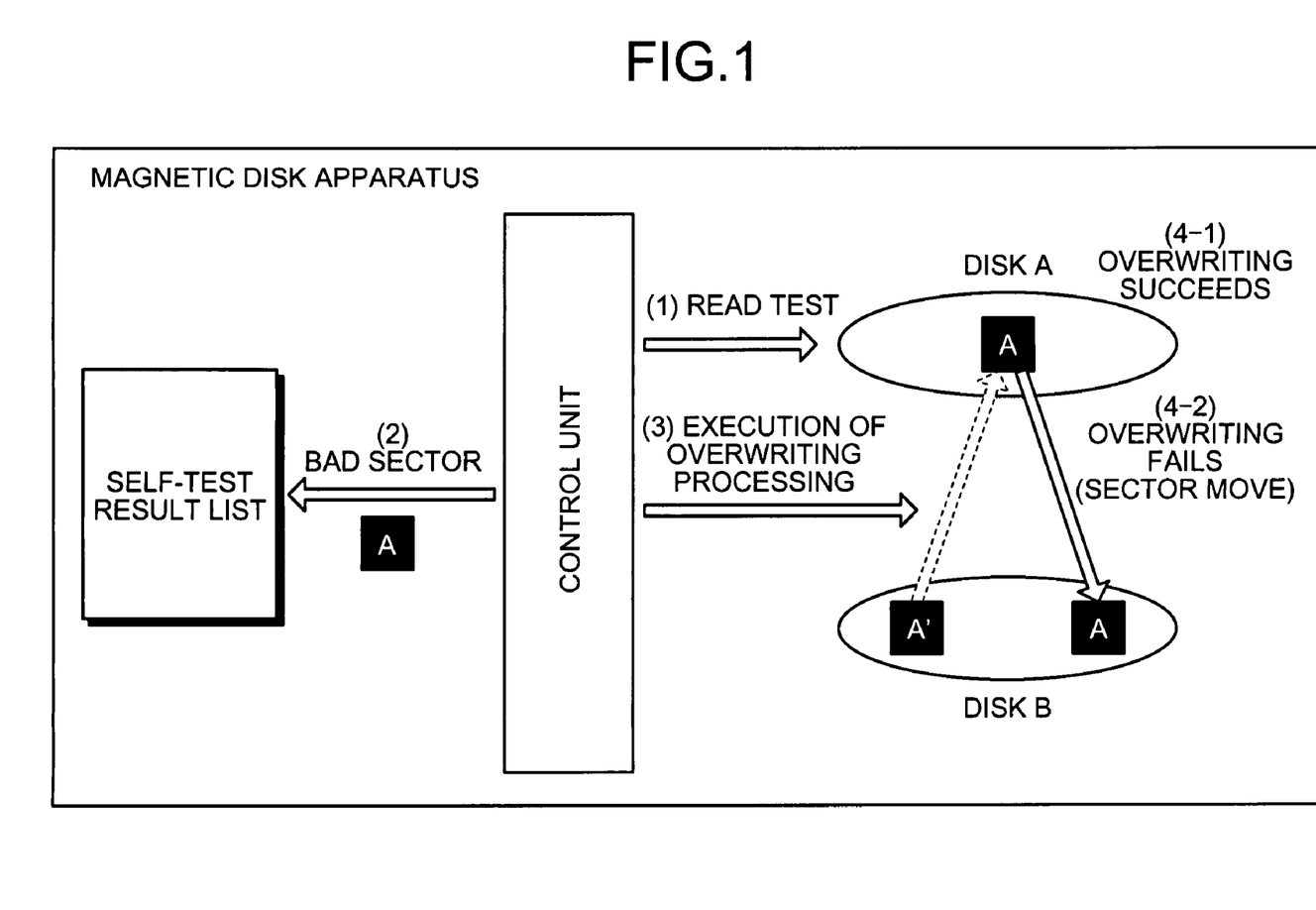
FIG. 1 is a schematic for illustrating an outline of a failure recovering method according to the present invention.

Exemplary embodiment of the present invention will be explained in detail below with reference to the accompanying drawings. FIG. 1 is a schematic for illustrating an outline of a failure recovering method according to the present invention, showing a case of applying the failure recovering method to a magnetic disk apparatus.

As shown in FIG. 1, a control unit in the magnetic disk apparatus executes a "read test" on all the sectors in each medium (for instance, disk A) at a predetermined timing. The "read test" means a test to read the data on each sector and register a sector that failed to be read in a "self-test result list" shown in the figure as a "bad sector", and is executed by, for instance, operating a "self-test" in the SMART function.

Subsequently, the control unit executes an overwriting processing of the data on the detected bad sector. For instance, to explain a case of a "sector A" on the disk A shown in the figure being detected as the bad sector, in the overwriting processing, the data in a "sector A'" on a disk B having the identical data to the "sector A'" on the disk A is written in the "sector A" on the disk A.

When the overwriting is successful, the normal data is set for the sector A (bad sector). When the overwriting fails, the sector A moves to a backup sector (for instance, disk B) so that the faulty reading may not occur. The move of the sector is performed by changing link information corresponding to the sector.

In this way, with the failure recovering method according to the present invention, when the self-test by the SMART function detects a bad sector, the data of the bad sector or a disk including the bad sector is overwritten using a duplicated data prepared in advance. By overwriting, the data loss due to temporary failure can be recovered (if overwriting is successful), and in case of permanent failure (if overwriting fails), the permanently failed section is no longer accessed by forcing the sector move to be generated. Therefore, regardless of a result of the overwriting processing, the bad sector can be recovered.

Figure 2:
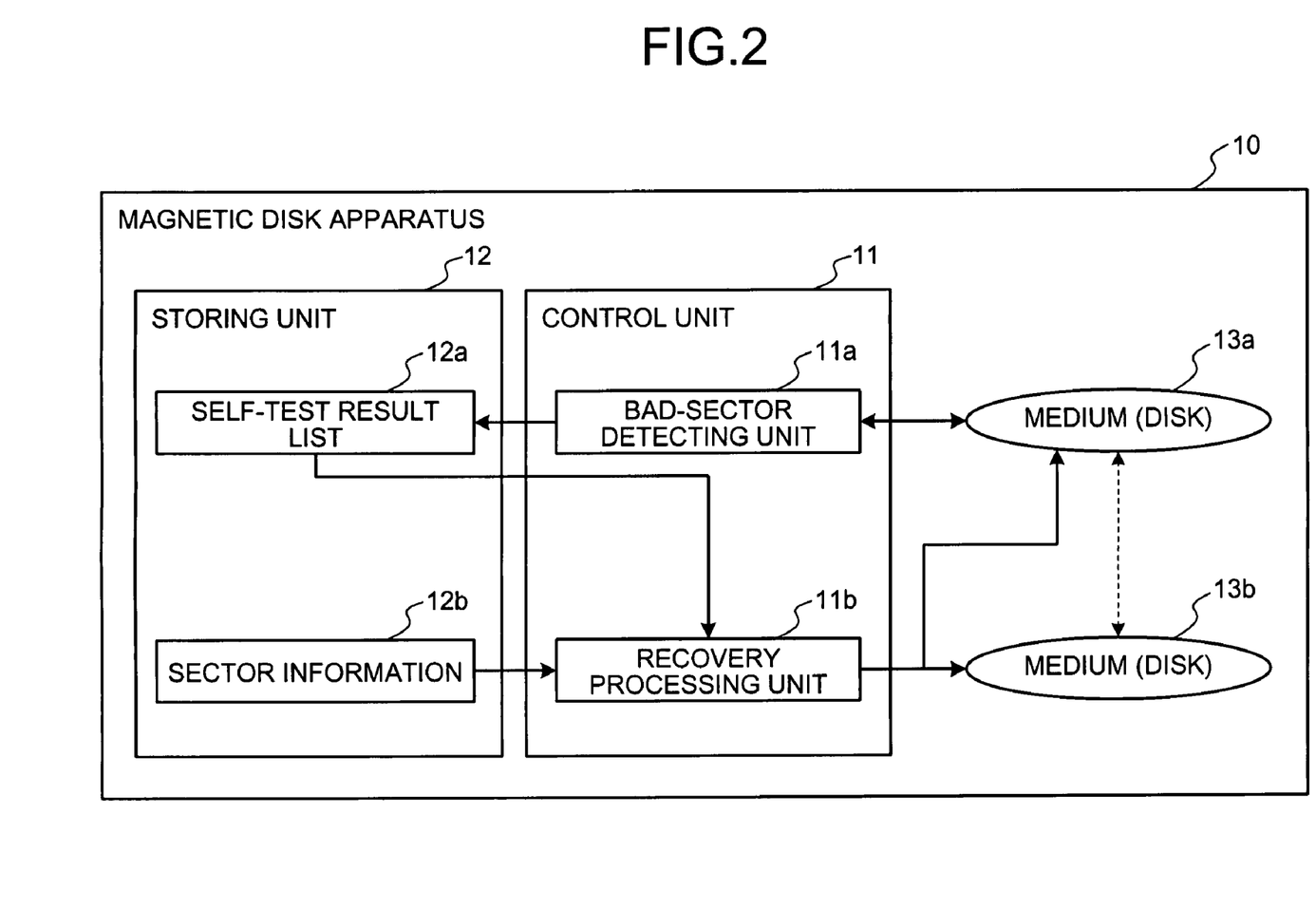
FIG. 2 is a block diagram of a magnetic disk apparatus according to a first embodiment of the present invention.

FIG. 2 is a block diagram of a magnetic disk apparatus 10 according to a first embodiment of the present invention. The figure indicates only processing sections required for achieving the failure recovering method but other processing sections are omitted.

The magnetic disk apparatus 10 includes a control unit 11, a storing unit 12, and a medium 13. The medium 13 is shown to include a medium 13a and a medium 13b for as a matter of convenient explanation, but the number of media is not limited.

The control unit 11 includes a bad-sector detecting unit 11a and a recovery processing unit 11b. The storing unit 12 stores a self-test result list 12a and sector information 12b. The control unit 11 is a processing section that detects a bad sector by executing the self-test by the SMART function on each medium and executes the recovery processing on the detected bad sector.

The bad-sector detecting unit 11a executes the read test on each sector on the medium by operating the self-test by the SMART function at a predetermined timing and registers the sector that failed the read test in the self-test result list 12 in the storing unit 12 as a bad sector.

The recovery processing unit 11b executes a recovery processing of the bad sector by overwriting the data in the bad sector detected by the bad-sector detecting unit 11a. The recovery processing unit 11b obtains information concerning the bad sector by referring to the self-test result list 12a and also obtains data for overwriting (duplicated data) by referring to the sector information 12b indicating the storing location of the duplicated data concerning each sector. The recovery processing unit 11b then recovers the bad sector by overwriting the bad sector with the data for overwriting.

The execution of the overwriting can recover the data loss due to a temporary failure (if overwriting is successful), and in the case of permanent failure (if overwriting fails), the permanently failed section is no longer accessed by forcing the sector move to be generated. Therefore, regardless of a result of the overwriting processing, the bad sector can be recovered.

The storing unit 12 includes a recording device (not shown) such as a non-volatile random access memory (RAM) for storing the self-test result list 12a and the sector information 12b. The self-test result list 12a includes information on the bad sector detected by the bad-sector detecting unit 11a. The sector information 12b is information relating each sector with the storing location of the duplicated data.

Figure 3:
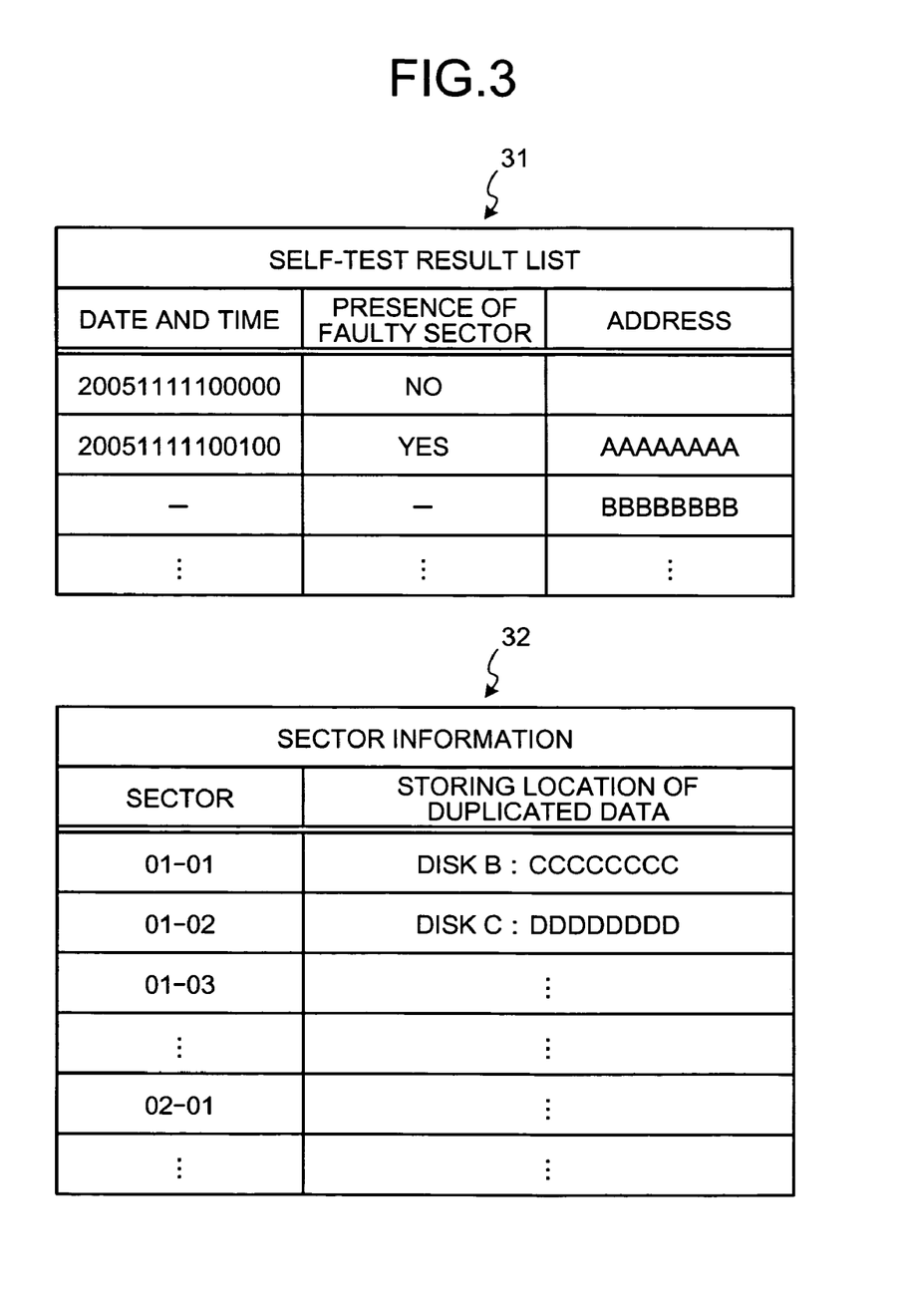
FIG. 3 is a schematic for illustrating examples of self-test result list and sector information.

FIG. 3 is a schematic for illustrating examples of the self-test result list 12a and the sector information 12b. A table 31 shows an example of the self-test result list 12a, and a table 32 shows an example of the sector information 12b.

As shown in the table 31, the self-test result list 12a is information including "date and time" when the self-test started, "presence of bad sector" indicating whether any bad sector is detected, and "address" of the bad sector, as list items. For instance, it is found that no bad sector was detected in the self-test executed on Nov. 11, 2005 10:00:00, and that two bad sectors each located at the address of "AAAAAAAA" and "BBBBBBBB" in the self-test executed on Nov. 11, 2005 10:01:00 were detected.

Also, as shown in the table 32, the sector information 12b is information including a "sector" for identifying each sector and a "storing location of duplicated data". For instance, it is found that the duplicated data of the sector "01-01" is stored in a location with the address of "CCCCCCCC" in "disk B", and that the duplicated data of the sector "01-02" is stored in a location with the address of "DDDDDDDD" in "disk C".

According to the present embodiment, the overwriting is executed only on a sector detected as a bad sector by using the sector information 12b described above. However, the embodiment may be configured not to use the sector information 12b but to replace the whole medium (disk) having the bad sector with another medium. Also, the embodiment may be configured to replace the whole magnetic disk apparatus including the media having the bad sector with another magnetic disk apparatus.

The medium 13 refers to each disk included in the magnetic disk apparatus 10. The magnetic disk apparatus 10 usually includes a plurality of disks, and such failure as disk damage may occur to a specific section of each disk. Also, a head (not shown) accesses each disk, and in case the head fails, the corresponding disk becomes unusable.

Figure 4:
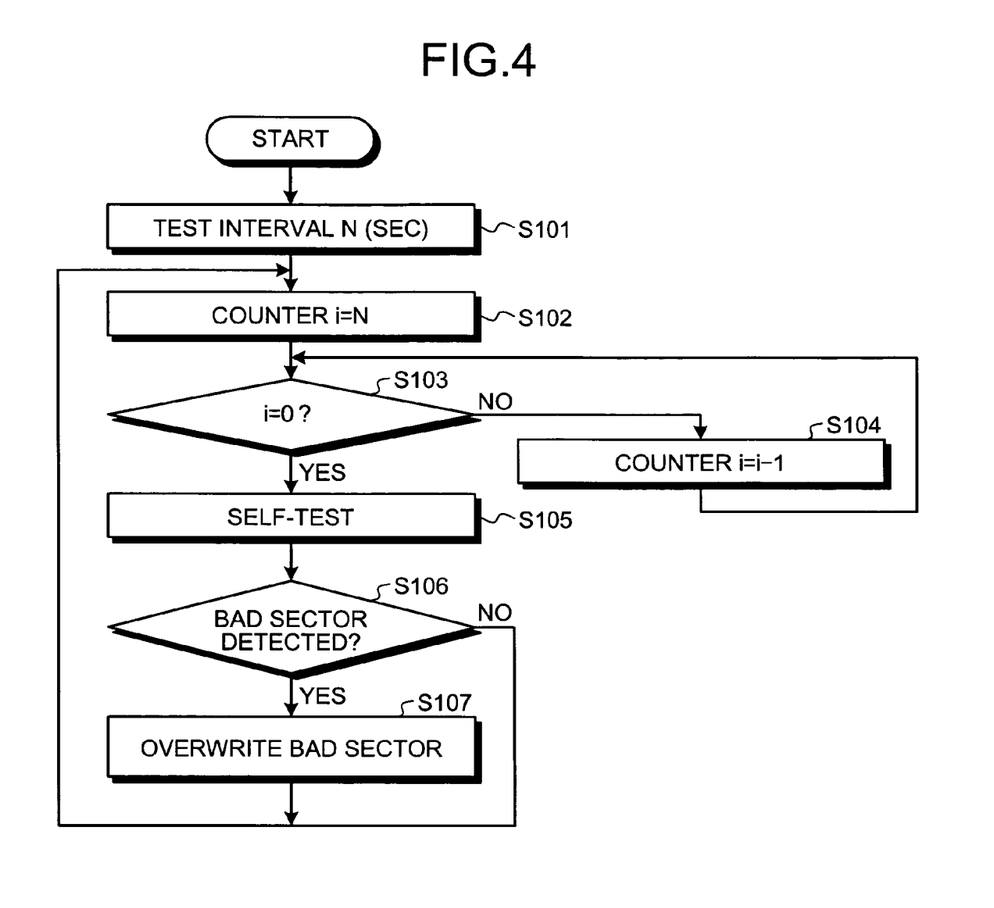
FIG. 4 is a flowchart of a processing procedure for a failure recovery process.

FIG. 4 is a flowchart of a processing procedure for a failure recovery process. A test interval of the self-test is set to N (sec) (step S101), and a counter i is initialized to N (step S102).

It is determined whether the counter i indicates zero (step S103). If the counter i does not indicate zero (Step S103, No), the value of the counter i is decremented by one (step S104). On the other hand, when the counter i indicates zero in step S103 (step S103, Yes), the bad-sector detecting unit 11a executes the self-test (step S105). The determining processing in step S103 is executed once per second.

The self-test then determines whether any bad sector is detected (step S106). If a bad sector is detected (step S106, Yes), the recovery processing unit 11b overwrites the bad sector (step S107). On the other hand, when no bad sector is detected in step S106 (step S106, No), steps S102 and subsequent steps are repeated without executing step S107.

The execution of the self-test is performed at a fixed interval (once per N seconds) by the bad-sector detecting unit 11a in the above example. However, it is not preferable to execute the self-test at the fixed interval because a periodical load is applied to the magnetic disk apparatus 10 though there is no bad sector at all.

Figure 5:
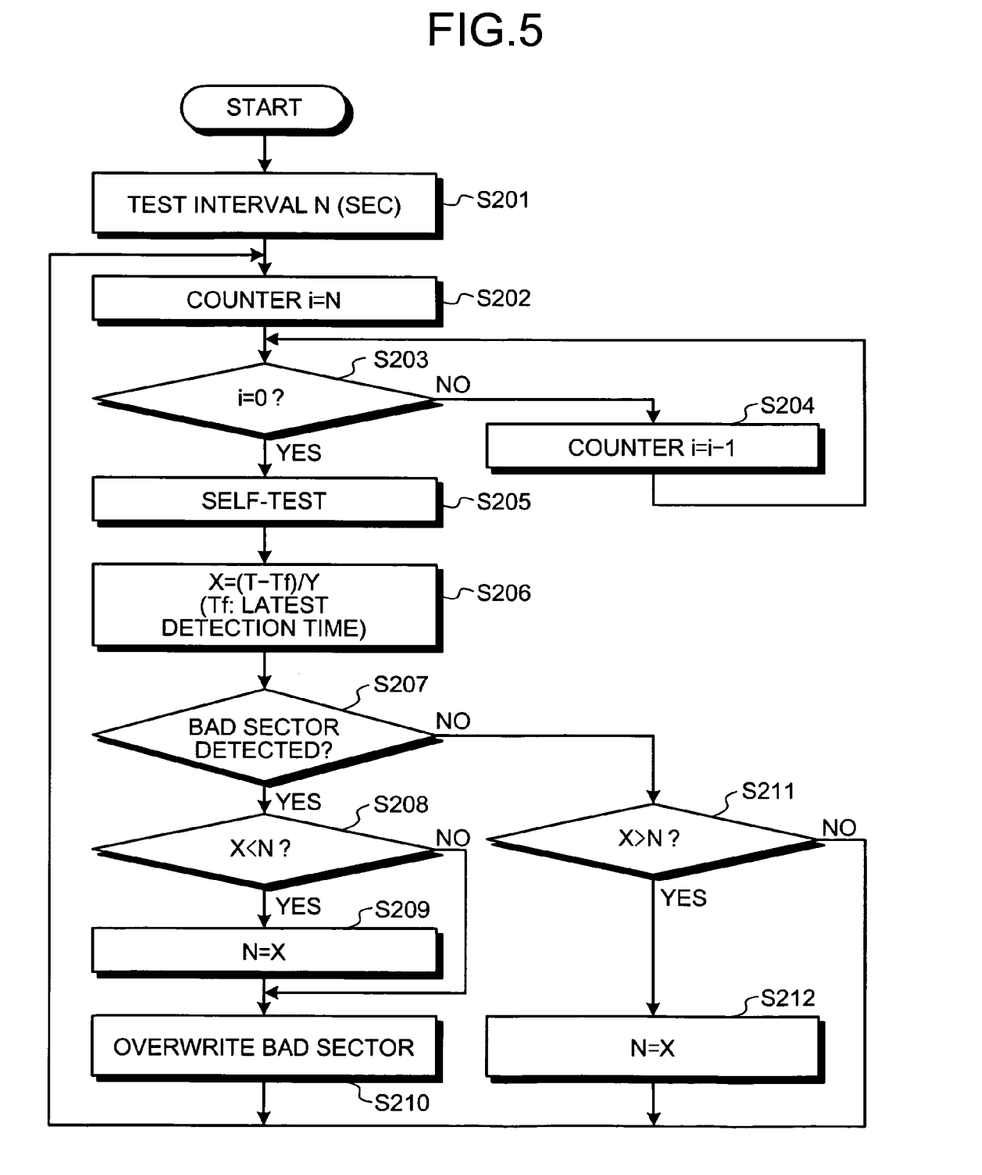
FIG. 5 is a flowchart of a processing procedure when a self-test is performed at variable intervals.

FIG. 5 is a flowchart of a processing procedure when the self-test is performed at variable intervals. The test interval of the self-test is set to N (sec) (step S201), and the counter i is initialized to N (step S202).

It is determined whether the counter i indicates zero (step S203). If the counter i does not indicate zero (Step S203, No), the value of the counter i is decremented by one (step S204). On the other hand, when the counter i indicates zero in step S203 (step S203, Yes), the bad-sector detecting unit 11a executes the self-test (step S205). The determining processing in step S203 is executed once per second.

A value X to be used for calculating the interval N until the next self-test is then calculated (step S206) as $$X=(T-Tf)Y$$

where T is the time at which the self-test in step S205 is executed, Tf is the time at which the most recent bad sector was detected, and Y is a set value for deciding how many times the interval of generation of the bad sector should be divided to execute the self-test. For instance, when the interval of generation of the bad sector is divided by ten to execute the self-test, Y is set to 10.

The self-test then determines whether any bad sector is detected (step S207). If a bad sector is detected (step S207, Yes), it is determined whether X calculated in step S206 is smaller than N (step S208). When X is smaller than N (step S208, Yes), X is substituted for N (step S209), and the recovery processing unit 11b overwrites the bad sector (step S210). When X is equal to or larger than N (step 208, No), processing moves to S210 without processing step S209.

On the other hand, when no bad sector is detected in step S207 (step S207, No), it is determined whether X calculated in step S206 is larger than N (step S211). When X is larger than N (step S211, Yes), X is substituted for N (step S212). When X is smaller than N (step S211, No), steps S202 and subsequent steps are repeated without processing step S212.

In this way, the variable interval of execution of the self-test according to frequency of detecting the bad sector allows for reducing load applied by execution of the self-test and recovering failures at the same time. While FIG. 5 shows a case in which the interval of execution of the self-test is variable according to frequency of detecting the bad sectors, another configuration is allowable to change the interval of executing the self-test according to the error rate (for instance, frequency of retry errors). Detecting an indication of bad sectors in this way can prevent occurrence of bad sectors in advance.

According to the present embodiment, the recovery processing unit 11b executes overwriting processing only on the bad sector was explained above. However, when the read test detects a bad sector, it may be highly possible that not only the detected bad sector but also sectors in neighborhood of the bad sector be present.

Figure 6:
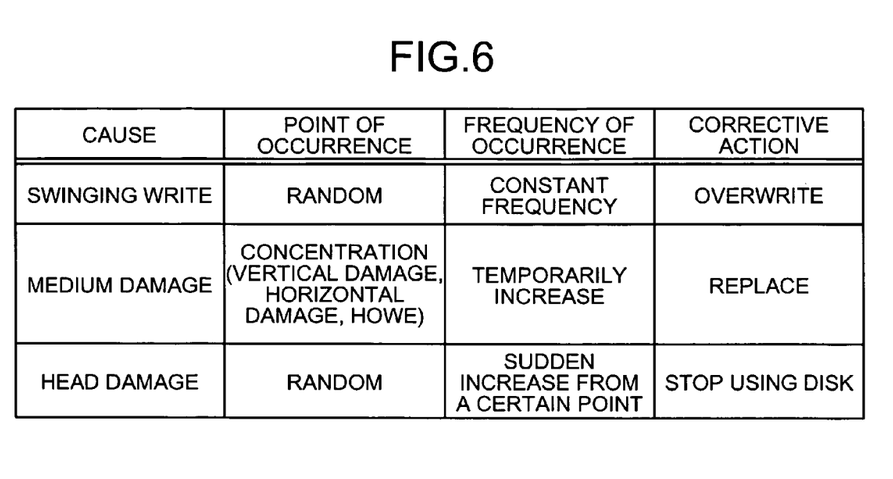
FIG. 6 is a schematic for illustrating examples of cause of a bad sector.

FIG. 6 is a schematic for illustrating examples of cause of a bad sector. The causes of the bad sector include swinging write, medium damage, and head damage.

The swinging write means a temporary failure of access to a location of a regular medium due to vibration of the apparatus or mechanical shift. Such bad sectors caused by the swinging write tend to occur at random points, and the frequency of occurrence tends to be constant. And the bad sector caused by the swinging write can be recovered by overwriting.

The medium damage means a damage to the medium 13a or 13b shown in FIG. 2. Such bad sectors caused by the medium damage tend to occur in a concentrated area and the frequency of occurrence tends to temporarily increase. And the bad sectors caused by the medium damage can be recovered by sector replacement. In other words, as described above, the sector replacement can also be referred to as the recovery by overwriting because the sector replacement is automatically executed when overwriting fails.

Figure 7:
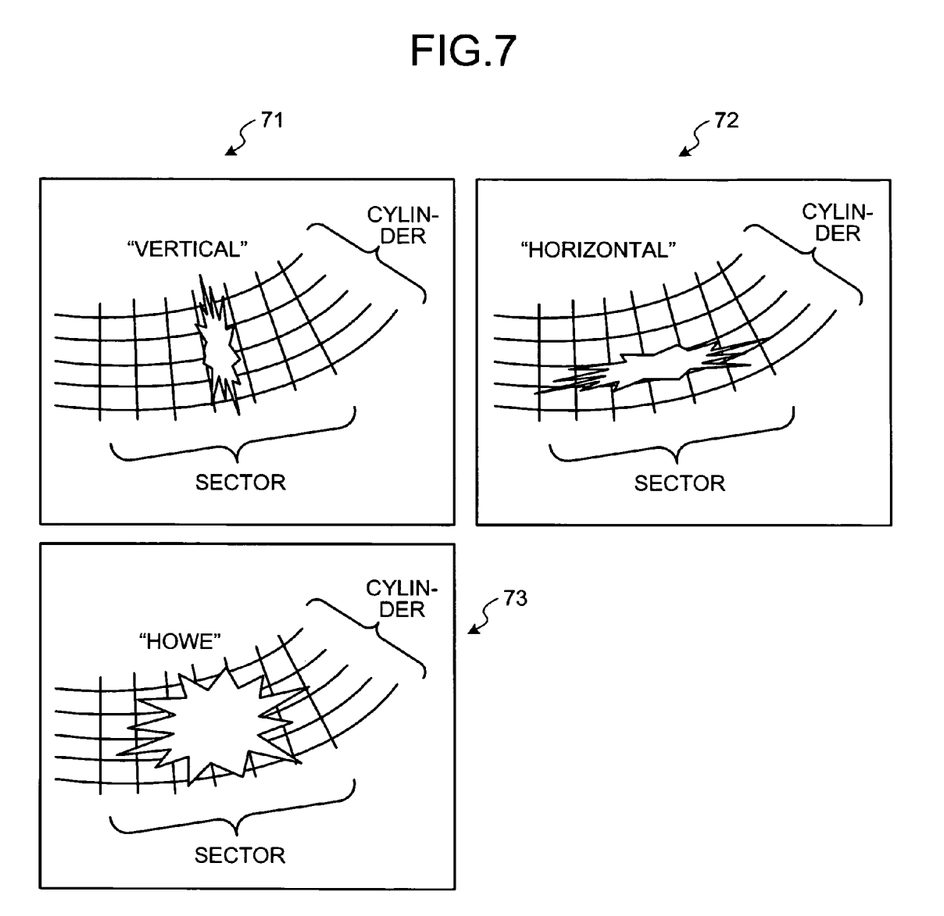
FIG. 7 is a schematic for illustrating a concentration of bad sectors.

FIG. 7 is a schematic for illustrating a concentration of bad sectors. In FIG. 7, a reference numeral 71 shows a case of a "vertical damage", a reference numeral 72 shows a case of a "horizontal damage", and a reference numeral 73 shows a case of a "howe" created on the medium 13a or 13b.

When the medium 13a or 13b is damaged, a group of sectors having close cylinder numbers or close sector numbers tend to become bad sectors. In this way, bad sectors caused by the medium damage occur in a specific area, and sectors located at other areas are very likely to be normal. Therefore, when bad sectors temporarily increase, assuming the cause is medium damage (see FIG. 6), execution of overwriting only the neighborhood of the bad sector can recover the failure by inducing sector replacement in the area having media damage.

The head damage means a damage to a head (not shown) for accessing the medium 13a or 13b in FIG. 2 due to some factor. The bad sectors caused by the head damage tend to occur at random points and the frequency of occurrence tends to drastically increase at a certain point of time. And the bad sectors caused by the head damage can be recovered by stopping the corresponding disk, namely by changing the disk having the bad sectors to a replacement disk.

Figure 8:
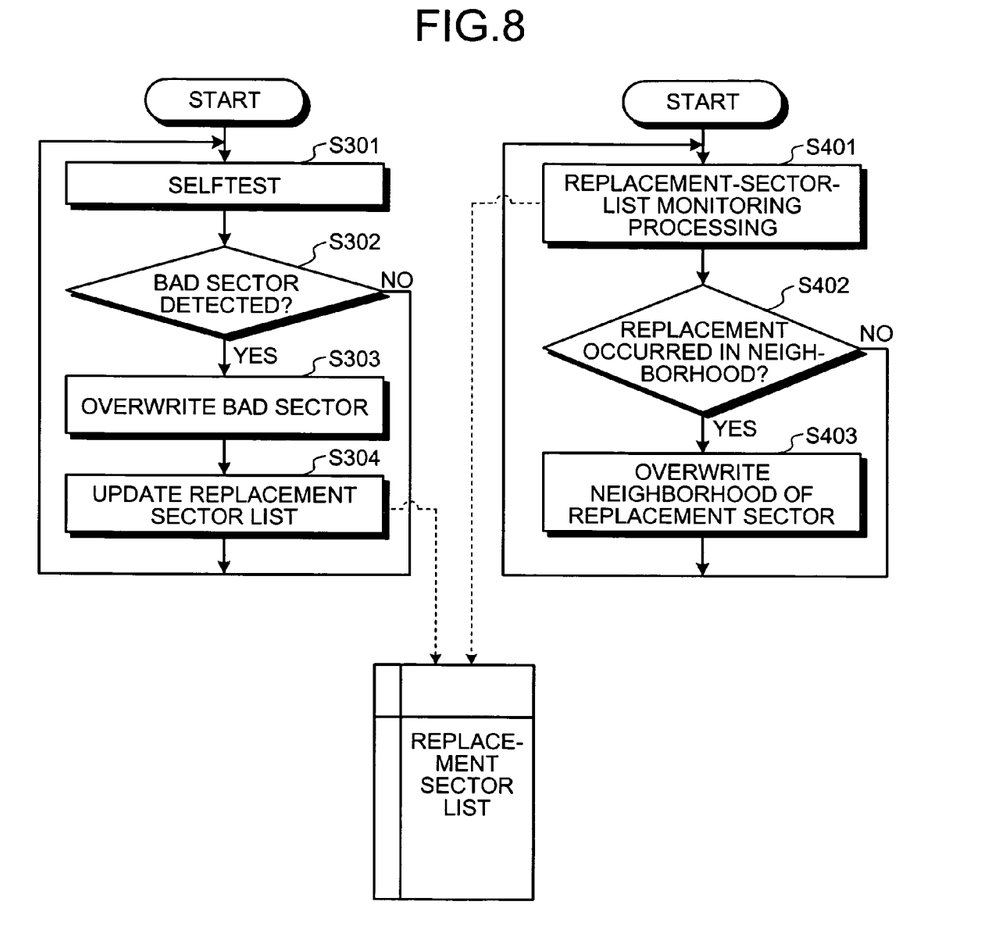
FIG. 8 is a flowchart of a processing procedure for a process of overwriting neighborhood of a bad sector.

FIG. 8 is a flowchart of a processing procedure for a process of overwriting neighborhood of the bad sector. Steps S301 to S304 shown in the figure indicates the processing procedure simplified from the processing procedure shown in FIG. 4 or 5, and steps S401 to S403 indicates the processing procedure of overwriting the neighborhood with reference to a "replacement sector list" recording conditions of the sector replacement resulting from the overwriting processing.

When the bad-sector detecting unit 11a executes the self-test (step S301) and the bad sector is detected (step S302, Yes), the recovery processing unit 11b overwrites the bad sector (step S303). And when the sector replacement takes place as a result of overwriting in step S303, the replacement sector list is updated to record the condition of the sector replacement (step S304), and steps S301 and after are repeated.

Also, monitoring of the replacement sector list is executed on a steady basis (step S401). When sector replacement occurs in a predetermined area (neighborhood) (step S402, Yes), the neighborhood of the replacement sector is overwritten (step S403) to repeat the steps S401 and after. When sector replacement does not occur in the predetermined area (neighborhood) (step S402, No), steps S402 and after are repeated without executing step S403.

The replacement sector list shown in FIG. 8 is created on the storing unit 12 shown in FIG. 2. Also, the replacement sector list may be included in the sector information 12b shown in FIG. 2.

As described above, the embodiment is configured to register bad sectors in the self-test result list that were detected by the bad-sector detecting unit executing reading processing of each sector at a predetermined timing, executes overwriting processing with the recovery processing unit using duplicated data on a medium area including at least the bad sector detected by the bad-sector detecting unit, replace false data with the duplicated data when the overwriting succeeds, and induce sector move when overwriting fails. Therefore, the data loss due to temporary failure can be recovered (when overwriting succeeds), and in case of permanent failure (when overwriting fails), failure recovery can be executed by forcing sector move to be generated. Thus, regardless of a result of the overwriting processing, an appropriate failure recovery can be executed.

While the explanation of the first embodiment was given based on the failure recovering method of recovering a failure after detecting a bad sector, for example, by performing a self-test while the magnetic disk apparatus is offline, the present invention is not limited to this. In other words, a quasi-bad sector (namely, a sector highly provable to have damaged data) can be detected while the magnetic disk apparatus is online to recover the failure.

Namely, because the self-test is performed while the magnetic disk apparatus is offline, the failure recovering method according to the first embodiment enables detection of bad sectors in the entire range of the medium including areas where data is not written and areas that is rarely accessed. On the other hand, read-access errors cannot be perfectly prevented if a read access is accepted after the self-test is performed and before bad sectors are detected.

Figure 9:
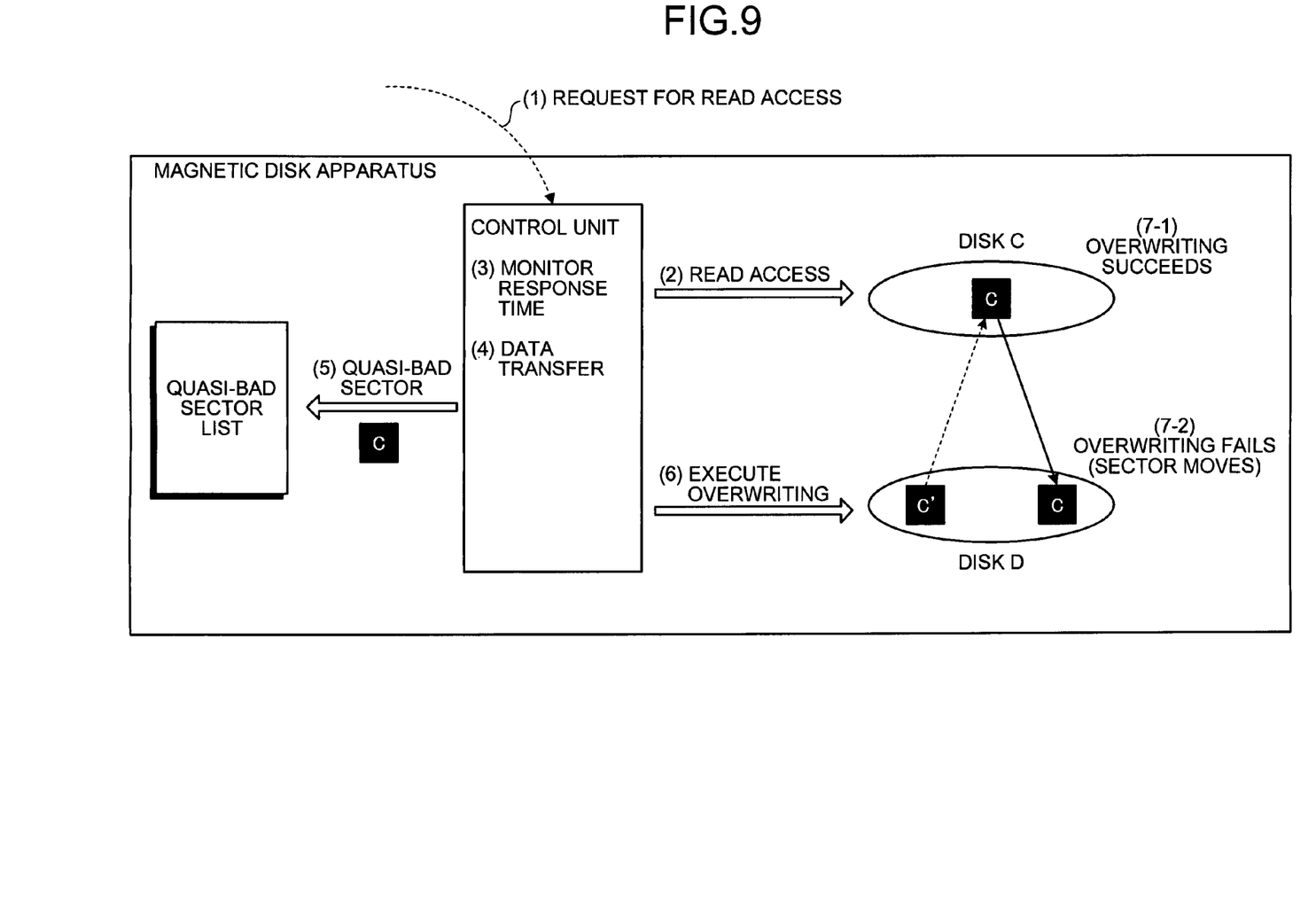
FIG. 9 is a schematic for illustrating an outline of a magnetic disk apparatus according to a second embodiment.

FIG. 9 is a schematic for illustrating an outline of a magnetic disk apparatus 20 according to a second embodiment. The magnetic disk apparatus 20 shown in FIG. 9 detects a bad sector by performing a read test on each sector, and perfectly prevents any read error.

As shown in FIG. 9, when the control unit of the magnetic disk apparatus 20 accepts a read-access request from a user (see (1) in FIG. 9), the control unit performs a read access to an intended medium (for example, disk C) (see (2) in FIG. 9) and starts monitoring the time for a response from the intended medium to the read access (see (3) in FIG. 9). As a result of the monitoring, if the response is not detected within a predetermined time period, the control unit transfers data in a sector C' on a disk D to the user (see (4) in FIG. 9). The sector C' has the same data as in a sector C on a disk C to which the read access was originally requested.

If the response is not made within the predetermined time period, the control unit detects and registers the sector on the disk C as a quasi-bad sector that is highly provable to have damaged data (see (5) in FIG. 9). Subsequently, the control unit overwrites the detected quasi-bad sector with data (see (6) in FIG. 9). Specifically, the control unit writes the data in the sector C' transferred to the user into the sector C on the disk C. When the control unit succeeds at overwriting (see (7-1) in FIG. 9), the correct data is stored in the sector C.

On the other hand, if the control unit fails to overwrite (see (7-2) in FIG. 9), the control unit moves the sector C to an extra sector (for example, the disk D) so that reading should not fail. The sector is moved by changing link information corresponding to the sector.

The magnetic disk apparatus 20 according to the second embodiment is thus advantageous in that the read error can be perfectly prevented by overwriting or recovering data also in a sector highly provable to have damaged data detected while the magnetic disk apparatus 20 is online.

Figure 10:
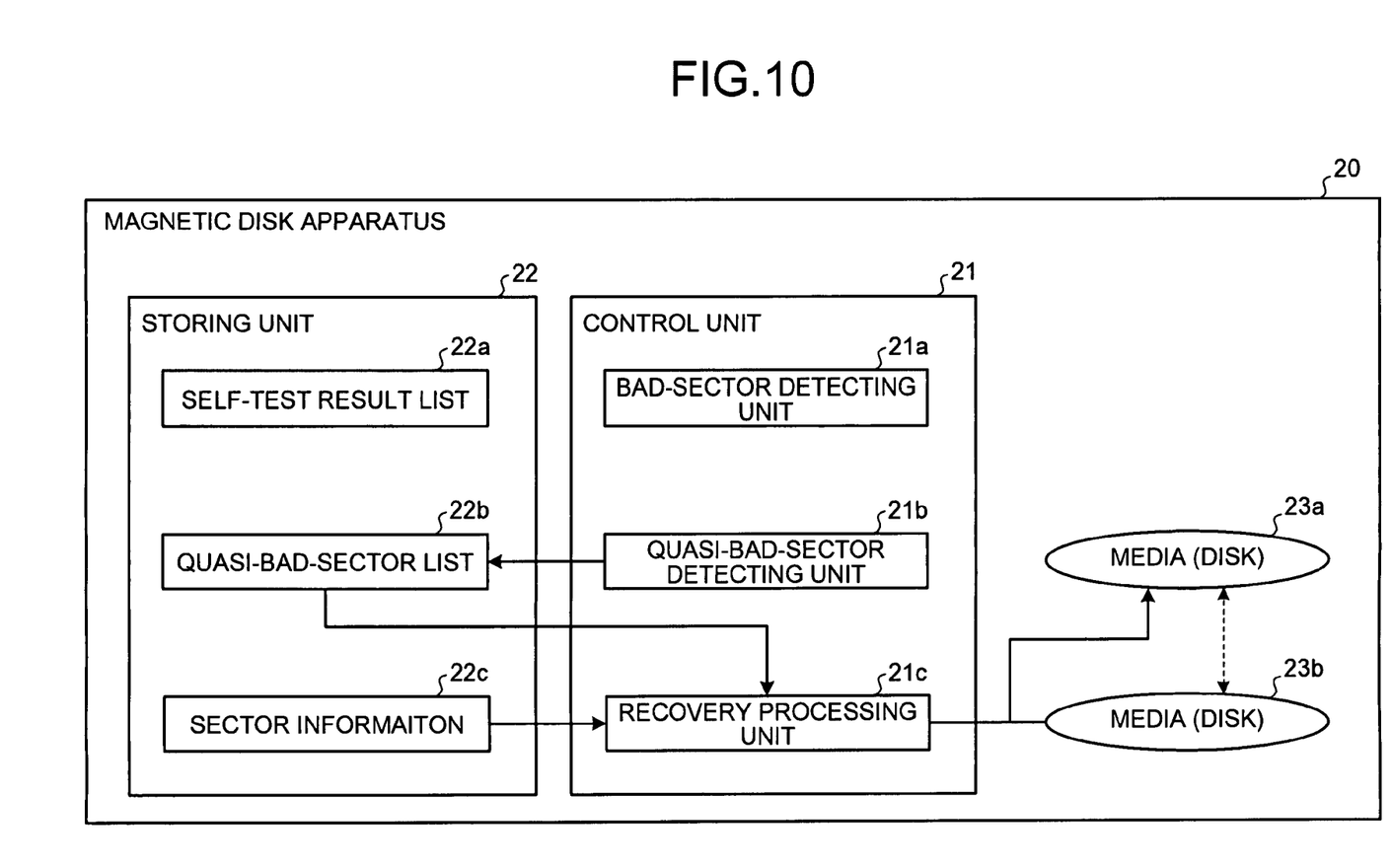
FIG. 10 is a block diagram of the magnetic disk apparatus shown in FIG. 9.
Figure 11:
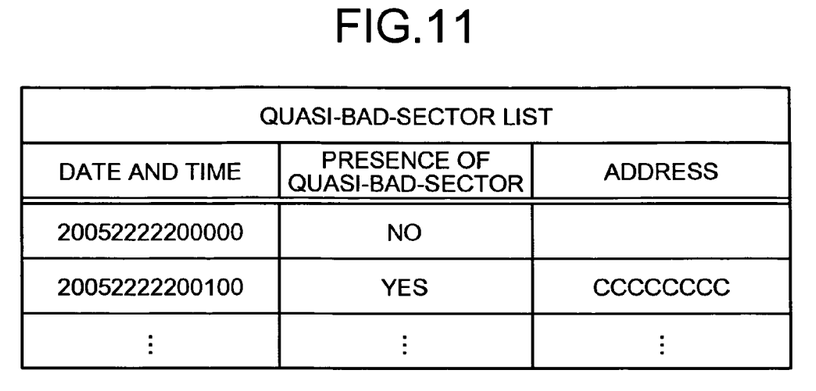
FIG. 11 is a schematic for illustrating an example of quasi-bad sector list.

FIG. 10 is a block diagram of the magnetic disk apparatus 20 according to the second embodiment, and FIG. 11 is a schematic for illustrating an example of quasi-bad sector list. The magnetic disk apparatus 20 according to the second embodiment is basically the same as that according to the first embodiment except for the following features.

A quasi-bad sector detecting unit 21b in a control unit 21 detects a quasi-bad sector that is highly provable to have damage to data written to the sector on a medium. Specifically, upon receiving a read access from the user, the quasi-bad sector detecting unit 21b performs the read access to the intended medium and monitors, for example, the time for the response from the intended medium to the read access. As a result of the monitoring, if the response is not detected within the predetermined time period, the quasi-bad sector detecting unit 21b detects the intended sector as a quasi-bad sector.

The quasi-bad sector detecting unit 21b can detect a quasi-bad sector, for example, when the number of retries of read accesses to the intended medium reaches a predetermined number, as well as by monitoring the time for the response as described above.

A recovery processing unit 21c in the control unit 21 recovers the quasi-bad sector by overwriting data therein. More specifically, the recovery processing unit 21c acquires information related to the quasi-bad sector by referring to a quasi-bad sector list 22b to be described later, and acquires data for overwriting (duplicated data) by referring to sector information 22c that indicates the location of duplicated data corresponding to each sector. The recovery processing unit 21c thus recovers the quasi-bad sector by overwriting the quasi-bad sector with the data for overwriting.

The quasi-bad sector list 22b in a storing unit 22 stores therein the information related to the quasi-bad sector detected by the quasi-bad sector detecting unit 21b. More specifically, for example, as shown in FIG. 11, the information includes list items "date and time" that indicates the time at which the quasi-bad sector is detected; "presence of quasi-bad sector" that indicates whether any quasi-bad sector is detected; and "address" that indicates the address of the quasi-bad sector.

Figure 12:
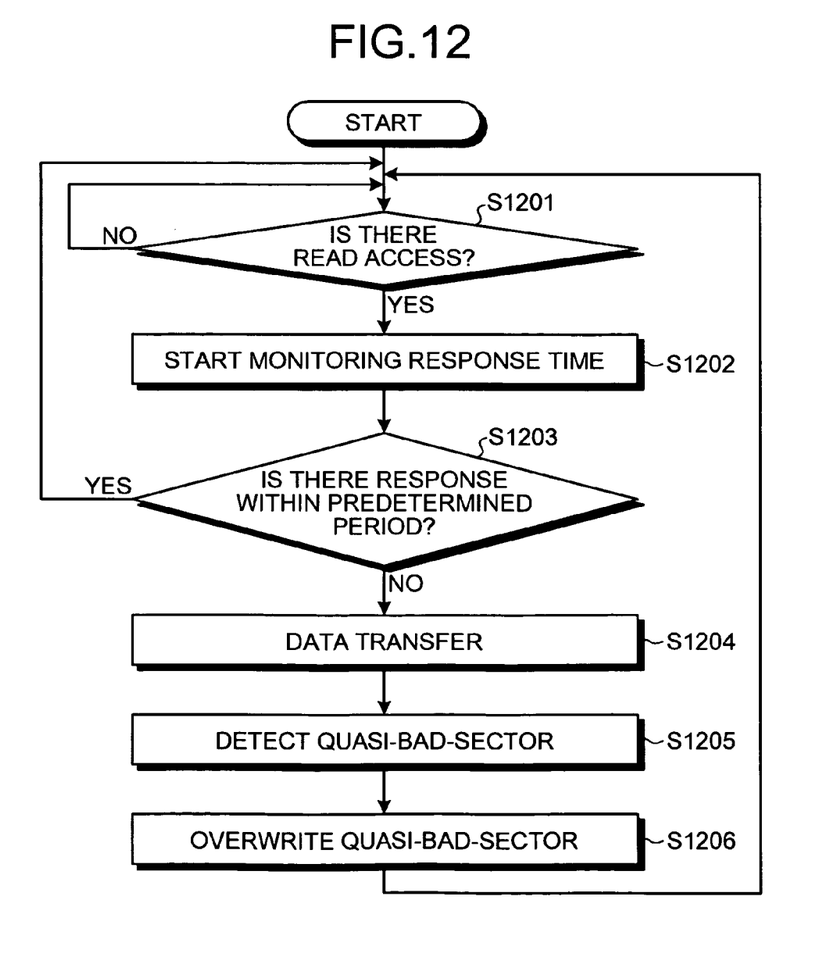
FIG. 12 is a flowchart of a processing procedure performed by the magnetic disk apparatus according to the second embodiment.

FIG. 12 is a flowchart of a processing procedure performed by the magnetic disk apparatus 20 according to the second embodiment. When the control unit 21 accepts a request for a read access (YES at step S1201), the control unit 21 performs the read access to the intended medium and starts monitoring the time for a response from the medium (step S1202).

As a result of the monitoring, if the response is not detected within a predetermined time period (NO at step S1203), the control unit 21 transfers data in a sector C' on a disk D, for example, to the user (step S1204), where the sector C' has the same data as in a sector C on a disk C to which the read access was originally requested. On the contrary, if the response is detected within the predetermined time period (YES at step S1203), the control unit 21 waits for the next read access.

If the response is not detected within a predetermined time period, the control unit 21 detects the sector on the disk C as a quasi-bad sector that is highly provable to have damaged data (step S1205) and registers it to the quasi-bad sector list.

Subsequently, the control unit 21 overwrites the detected quasi-bad sector with data (step S1206). Specifically, the control unit 21 writes the data in the sector C' transferred to the user into the sector C on the disk C. When the control unit succeeds at overwriting (see (7-1) in FIG. 9), the correct data is stored in the sector C.

On the other hand, though not shown in FIG. 12, if the control unit fails to overwrite, the control unit 21 moves the sector C to an extra sector (for example, the disk D) so that reading should not fail. The sector is moved by changing link information corresponding to the sector. The process by the magnetic disk apparatus 20 according to the second embodiment explained above is repeated while the magnetic disk apparatus 20 is in operation.

As described above, according to the second embodiment, the control unit 21 monitors a sector to which the read access from the user is accepted; if the read access fails (for example, if the response is not detected within a predetermined time period or if the read access is retried repeatedly), detects the sector as the quasi-bad sector and overwrites the data on the quasi-bad sector with the duplicated data; and if overwriting fails, recovers the data by writing the duplicated data to another sector. Therefore, the magnetic disk apparatus according to the second embodiment is advantageous in that the magnetic disk apparatus can perfectly prevent any read error by detecting a quasi-bad sector upon receiving a read access from the user to overwrite or recover the data in the quasi-bad sector while the magnetic disk apparatus is online, as well as detecting bad sectors in the entire range of the medium including areas where data is not written and areas that is rarely accessed while the magnetic disk apparatus is offline.

The magnetic disk apparatus according to the second embodiment can also overwrite the data on a sector near the quasi-bad sector with duplicated data thereof. This is advantageous in that a read error can be prevented by overwriting the data on the sector near the quasi-bad sector in consideration of a possibility that the sector may have been damaged.

If a detected quasi-bad sector is located near a sector enlisted in the quasi-bad sector list, the magnetic disk apparatus according to the second embodiment can also overwrite sectors near the quasi-bad sectors at a time. Because data in the sectors near the quasi-bad sectors are highly provable to be damaged in such a case, a read error can be more reliably prevented by overwriting the adjacent sectors at a time.

The self-test explained in the first embodiment can be also performed on the quasi-bad sector after a quasi-bad sector is detected based on the process explained in the second embodiment (see FIG. 12). This is advantageous in that the bad sector can be efficiently detected and recovered by performing the self-test after narrowing down the sectors that are highly provable to have damaged data.

According to an embodiment of the present invention, in either case of a temporary failure and a permanent failure, an appropriate failure recovery can be advantageously performed.

Furthermore, according to an embodiment of the present invention, a recovery can be advantageously performed in a simple manner by replacing a recording apparatus including the bad sector with other recording apparatus.

Moreover, according to an embodiment of the present invention, the time required for the failure recovery can be advantageously reduced.

Furthermore, according to an embodiment of the present invention, it is possible to perfectly prevent any read error by detecting a quasi-bad sector upon receiving a read access from the user to overwrite or recover the data in the quasi-bad sector at a time of online, as well as detecting bad sectors in the entire range of the medium including areas where data is not written and areas that is rarely accessed at a time of offline.

Moreover, according to an embodiment of the present invention, it is possible to prevent a read error by overwriting the data on the sector near the quasi-bad sector in consideration of a possibility that the sector may have been damaged.

Furthermore, according to an embodiment of the present invention, a read error can be more reliably prevented by overwriting the adjacent sectors at a time.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A failure recovering method for a recording apparatus having a bad sector detecting function for detecting a bad sector by executing a read test on each sector, the failure recovering method comprising:
   detecting the bad sector by activating the bad sector detecting function at a predetermined interval; and
   recovering, when the bad sector is detected at the detecting, the bad sector by overwriting data on the bad sector with a duplication of the data, and when overwriting fails, by writing the duplication of the data on other sector.

2. The failure recovering method according to claim 1, wherein
   the recovering includes overwriting, when the bad sector is detected at the detecting, all data on the recording apparatus including the bad sector with a duplication of the all data created on other recording apparatus.

3. The failure recovering method according to claim 1, further comprising:
   storing sector information indicating a correspondence between each sector and data stored in the sector, wherein
   the recovering includes, when a bad sector is detected at the detecting,
      identifying data to be stored in the bad sector based on the sector information stored at the storing; and
      overwriting the data on the bad sector with the duplication of the data.

4. The failure recovering method according to claim 1, wherein
   the detecting includes changing the predetermined interval based on a detecting interval of the bad sector.

5. The failure recovering method according to claim 1, wherein
   the detecting includes changing the predetermined interval based on a detecting interval of either one of a sector that required a longer time than a predetermined time for reading the data and a sector that required more than predetermined number of retries for reading the data.

6. The failure recovering method according to claim 1, wherein
   the recovering includes overwriting, when the bad sector is detected at the detecting, data on a sector located in neighborhood of the bad sector with a duplication of the data.

7. The failure recovering method according to claim 1, wherein
   the recovering includes, when a frequency of detecting the bad sector is higher than a predetermined value,
      regarding that the recording apparatus including the bad sector is faulty; and
      transferring all data to a replacement recording apparatus by using a duplication of the all data created on other recording apparatus.

8. The failure recovering method according to claim 1, further comprising:
   monitoring a sector to which a read access is accepted from a user; and
   quasi-detecting including
      detecting, when the read access fails, the sector as a quasi-bad sector, wherein
   the recovering includes recovering the quasi-bad sector by overwriting data on the quasi-bad sector with a duplication of the data, and when overwriting fails, by writing the duplication of the data on other sector.

9. The failure recovering method according to claim 8, wherein
   the recovering includes overwriting data on sectors near the quasi-bad sector with duplications of the data.

10. The failure recovering method according to claim 8, further comprising:
   storing a quasi-bad sector list in which the quasi-bad sectors detected at the quasi-detecting are listed, wherein
   the recovering includes
      referring to the quasi-bad sectors listed in the quasi-bad sector list; and overwriting, when the quasi-bad sector detected at the quasi-detecting is located near one of the quasi-bad sectors enlisted in the quasi-bad sector list, sectors near the quasi-bad sector with the duplication of the data.

11. A recording apparatus having a bad sector detecting function for detecting a bad sector by executing a read test on each sector, the recording apparatus comprising:

a detecting unit that detects the bad sector by activating the bad sector detecting function at a predetermined interval; and a recovering unit that recovers, when the bad sector is detected by the detecting unit, the bad sector by overwriting data on the bad sector with a duplication of the data, and when overwriting fails, by writing the duplication of the data on other sector.

12. The recording apparatus according to claim 11, further comprising:

a quasi-bad sector detecting unit that a sector to which a read access is accepted from a user, and detects, when the read access fails, the sector as a quasi-bad sector, wherein the recovering unit recovers the quasi-bad sector by overwriting data on the quasi-bad sector with a duplication of the data, and when overwriting fails, by writing the duplication of the data on other sector.

* * * * *